United States Patent
Dumarey et al.

(10) Patent No.: US 8,794,136 B2
(45) Date of Patent: Aug. 5, 2014

(54) ROBUST BALE EJECTOR SYSTEM

(75) Inventors: Robrecht M. K. Dumarey, Gistel (BE); Karel O. R. Naeyaert, Zedelgem (BE)

(73) Assignee: CNH Industrial America LLC, New Holland, PA (US)

( * ) Notice: Subject to any disclaimer, the term of this patent is extended or adjusted under 35 U.S.C. 154(b) by 57 days.

(21) Appl. No.: 13/545,924

(22) Filed: Jul. 10, 2012

(65) Prior Publication Data
US 2013/0014655 A1 Jan. 17, 2013

(30) Foreign Application Priority Data
Jul. 11, 2011 (BE) .................................. 2011/0439

(51) Int. Cl.
*B30B 15/32* (2006.01)
*A01F 15/08* (2006.01)

(52) U.S. Cl.
CPC ................. *A01F 15/0875* (2013.01)
USPC .......................... 100/35; 100/188 R; 100/218

(58) Field of Classification Search
USPC ........... 100/7, 35, 144, 179, 188 R, 215, 218; 414/24.5, 497, 501, 525.1, 525.2, 547
See application file for complete search history.

(56) References Cited

U.S. PATENT DOCUMENTS

| | | | | |
|---|---|---|---|---|
| 3,859,909 A | * | 1/1975 | Mast | 100/88 |
| 4,101,081 A | * | 7/1978 | Ritter et al. | 241/101.74 |
| 4,549,840 A | * | 10/1985 | Ansbjer | 414/24.5 |
| 4,791,865 A | * | 12/1988 | Naaktgeboren | 100/218 |
| 5,540,144 A | * | 7/1996 | Schrag et al. | 100/188 R |
| 7,093,537 B2 | * | 8/2006 | Dubois | 100/188 R |
| 2005/0172838 A1 | * | 8/2005 | Dubois | 100/218 |
| 2009/0249968 A1 | | 10/2009 | De Rycke et al. | |

* cited by examiner

*Primary Examiner* — Jimmy T Nguyen
(74) *Attorney, Agent, or Firm* — Patrick M. Sheldrake (57) ABSTRACT

An ejector system for a bale-forming chamber comprises a shuttle assembly having protrusions. This shuttle assembly is able to reciprocate to propel at least two bales towards a discharge outlet. The system furthermore comprises a tilting mechanism for tilting the shuttle assembly to retract a subset of the protrusions from an extended position projecting into the bale-forming chamber to a retracted position disposed outside the bale-forming chamber, thus, during movement of the shuttle assembly towards the discharge outlet, propelling only the bale present in the bale-forming chamber closest to the discharge outlet.

15 Claims, 3 Drawing Sheets

ROBUST BALE EJECTOR SYSTEM

This application claims foreign priority benefits under 35 USC §119(a)-(d) to Belgium Application BE2011/0439 filed Jul. 11, 2011 which is incorporated herein by reference in its entirety.

FIELD OF THE INVENTION

The present invention relates to the field of agricultural balers. More specifically, it relates to an ejector system of a square baler, and to a square baler having such an ejector system.

BACKGROUND OF THE INVENTION

Square balers are agricultural machines in which charges of crop material are fed into a bale-forming chamber and are compacted, typically by means of a reciprocating plunger. The bale-forming chamber usually includes a device for tying bales and a discharge outlet, for example connected to a discharge chute for gently lowering bales onto the field. During normal baling operation, tied bales are ejected from the baler through action of the plunger. However, there is often a need to remove a bale from the bale-forming chamber when normal discharge of the bales is not possible or desirable, e.g. at the end of a baling operation to remove remaining bales from the bale-forming chamber.

Auxiliary ejector systems for unloading bales from the baler, independently of the plunger reciprocation, are known in the art. Such an ejector system can comprise a shuttle assembly, mounted in a wall of the bale-forming chamber, comprising a frame that reciprocates in a direction parallel to the direction of movement of the bales in the bale-forming chamber and independently from the motion of the compacting plunger. Such frame typically has dogs projecting from it to engage with the bales, e.g. gripping the bale during forward strokes of the shuttle assembly, that is to say when it is moving towards the discharge outlet of the bale-forming chamber, and slipping relative to the bale, e.g. the underside thereof, during return strokes. In this way, the reciprocating movement of the shuttle assembly incrementally advances the bales out of the discharge outlet.

The ejector mechanism may be controllable to enable an operator to select whether to discharge only the last bale, nearest the discharge outlet, or both the last bale and the one before it. To achieve this, the dogs can be arranged on the shuttle assembly in a longitudinally extending series and at least some of the dogs may be controllable by the operator e.g. using a selector assembly, such as disclosed in EP0814951, so that the controlled dogs may be positioned either to extend into the bale-forming chamber or to be retracted from it.

In EP2108246, an ejector system is disclosed that furthermore does not require the operator to decide on which of the dogs to activate based on prior inspection of the position of the bales in the bale-forming chamber. This system comprises a first shuttle assembly with dogs to engage with the last bale and a second shuttle assembly, reciprocating independently of the first shuttle assembly, with dogs to engage with the next-to-last bale. It is a disadvantage of the ejector system of EP2108246 that it requires multiple actuators, one for a partial bale eject (i.e. where only the last bale is ejected, another bale remaining present in the bale-forming chamber), and another one for a full bale eject (i.e. where all bales are removed from the baler).

SUMMARY OF THE INVENTION

In a first aspect, an embodiment of the present invention provides an ejector system for ejecting bales from a bale-forming chamber of an agricultural baler. The ejector system comprises at least one shuttle assembly comprising a plurality of protrusions. The shuttle assembly is adapted for reciprocating movement so as to allow propelling of at least two bales along the bale-forming chamber in a forward direction towards a discharge outlet for ejection therefrom. The ejector system furthermore comprises a tilting means for tilting the at least one shuttle assembly so as to retract a subset of the plurality of protrusions from an extended position projecting into the bale-forming chamber to a retracted position disposed outside the bale-forming chamber, thus, during movement of the shuttle assembly in a direction towards the discharge outlet, propelling only the bale present in the bale-forming chamber closest to the discharge outlet.

It is an advantage of some embodiments of the present invention that a bale eject system is provided which enables the operator to choose between ejecting only the last bale in the bale-forming chamber or ejecting both the last and next-to-last bales.

It is an advantage of some embodiments of the present invention that a bale eject system is provided that is simple.

It is an advantage of some embodiments of the present invention that an automated bale eject system for an agricultural baler is provided, not requiring manual interaction of an operator for removing bales from a bale-forming chamber.

It is an advantage of some embodiments of the present invention that an automated bale eject system for an agricultural baler is provided that reduces the cost without compromising effectiveness.

It is an advantage of some embodiments of the present invention that an automated bale eject system for an agricultural baler is provided that requires only a single actuator for selectively executing a partial bale eject or a full bale eject.

It is an advantage of some embodiments of the present invention that no complex nor error prone mechanisms for (de)activating bale eject dogs are required.

It is an advantage of some embodiments of the present invention that an automated bale eject system for an agricultural baler is provided that increases the comfort of an operator.

In an ejector system according to some embodiments of the present invention, said plurality of protrusions may furthermore be adapted for moving past the at least two bales without shifting said at least two bales, during movement of the at least one shuttle assembly in a direction away from the discharge outlet.

In an ejector system according to some embodiments of the present invention, the at least one shuttle assembly may be adapted for mounting in a wall of the bale-forming chamber. In particularly advantageous embodiments, the shuttle assembly may be adapted for mounting in a floor of the bale-forming chamber.

It is an advantage of some embodiments of the present invention that a bale eject system is provided which is compact in design and does not create ground clearance problems.

The tilting means may be adapted for tilting the at least one shuttle assembly around a tilt axis substantially orthogonal to said forward direction and substantially parallel to the wall into which the shuttle assembly is mounted.

An ejector system according to some embodiments of the present invention may furthermore comprise a plurality of support elements for supporting the at least one shuttle assembly and for guiding said reciprocating movement of the at least one shuttle assembly. The tilting means may comprise means for retracting a subset of the plurality of support elements from an extended position projecting into the bale-forming chamber to a retracted position disposed outside the bale-forming chamber in order to tilt the shuttle assembly.

In an ejector system according to some embodiments of the present invention, the shuttle assembly may comprise an indented profile and the plurality of support elements may be adapted for supporting the at least one shuttle assembly at the indented profile. It is an advantage of embodiments of the present invention that a bale eject system is provided that is robust.

It is an advantage of some embodiments of the present invention that an automated bale eject system for an agricultural baler is provided that reduces the number of moving parts, thus alleviating problems with blockage of parts due to dust and/or debris being present in the environment.

It is an advantage of some embodiments of the present invention that an automated bale eject system for an agricultural baler is provided that obtains low maintenance requirements and/or low risks of mechanical failure.

The indented profile may be adapted for retracting the plurality of protrusions from the extended position to the retracted position during movement of the shuttle assembly in a direction away from the discharge outlet, while extending the plurality of protrusions in a direction towards the bale-forming chamber during movement of the shuttle assembly in a direction towards the discharge outlet. The plurality of protrusions may comprise a series of ridges and furrows separated by alternating steep and shallow edges, said series extending along a direction substantially parallel to the forward direction, such that the steep edges are adapted for engaging and propelling the bales in the bale-forming chamber during movement of the shuttle assembly in a direction towards the discharge outlet, and the shallow edges are adapted for slipping past said bales without shifting said bales during movement of the shuttle assembly in a direction away from the discharge outlet.

In an ejector system according to some embodiments of the present invention, the indented profile may comprise at least one indentation having a first length, and at least one indentation having a second length longer than the first length, wherein said indentations may be adapted for tilting the shuttle assembly and retracting the subset of the plurality of protrusions from the extended position to the retracted position, in order to propel only the last bale positioned in the bale-forming chamber closest to the discharge outlet during movement of the shuttle assembly in a direction towards the discharge outlet. The tilting means may comprise an actuator, for example a hydraulic actuator, adapted for driving the reciprocating motion of the shuttle assembly and adapted for tilting the shuttle assembly by shifting from a first range of reciprocating motion, having a stroke length shorter than the second length, to a second range of reciprocating motion, having a stroke length of at least the second length.

In an ejector system according to some embodiments of the present invention, the plurality of support elements may comprise a plurality of rollers.

In an ejector system according to some embodiments of the present invention, the plurality of protrusions may comprise dogs which are pivotably mounted on the shuttle assembly to pivot into an extended gripping position during forward movements of the shuttle to advance the bale towards the discharge outlet and to retract during reverse movements of the shuttle assembly to slip relative to the bale.

In a further aspect, some embodiments provide a method for ejecting a bale from a bale-forming chamber of an agricultural baler. The method comprises driving of a reciprocating movement of at least one shuttle assembly comprising a plurality of protrusions so as to allow propelling of one or more bales along the bale-forming chamber towards a discharge outlet for ejection therefrom, wherein driving of the reciprocating movement of the at least one shuttle assembly includes selecting a tilting angle of the at least one shuttle assembly so as to, depending on the selected tilting angle, propel only one bale or more than one bale.

The above discussed potential advantages may appear in one or more embodiments of the invention. These and other aspects of the invention will be apparent from and elucidated with reference to the embodiment(s) described hereinafter.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is to be understood that embodiments of the invention may be practiced without these specific details. In other instances, well-known methods, structures and techniques have not been shown in detail in order not to obscure an understanding of this description.

Where in embodiments of the present invention reference is made to agricultural balers, reference is made to machines for forming bales from agricultural crop material, such as forming rectangular bales by any suitable means, e.g. plungers.

Where in embodiments of the present invention reference is made to crop material, reference is made to any suitable type of biomass that can be harvested and packed in bales, such as for example hay, silage, straw or other.

Figure 1:
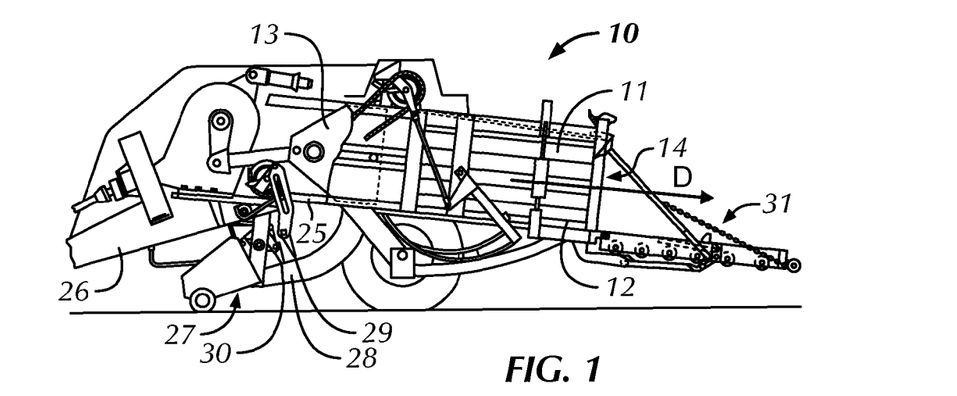
FIG. 1 illustrates a square baler to which an ejector system according to embodiments of the present invention may be applied.

Referring to the drawings, FIG. 1 shows an agricultural baler 10 comprising a frame 25 which is equipped with a forwardly extending tongue 26 at its front end with hitch means (not shown) for coupling the baler 10 to a towing tractor. A pick-up assembly 27 lifts windrowed crop material off the field as the baler 10 is travelled thereover, e.g. while being pulled by a tractor, and delivers such material into the front end of a rearwardly and upwardly curved, charge-forming feeder duct 28. The duct 28 communicates at its upper end with an overhead, fore-and-aft extending bale-forming chamber 11 into which crop charges are loaded by a cyclically operating stuffer mechanism 29. A continuously operating packer mechanism 30 at the lower front end of the feeder duct 28 continuously feeds and packs material into the duct 28 as to cause charges of the crop material to take on and assume the internal configuration of the duct 28 prior to periodic engagement by the stuffer 29 and insertion up into the bale-forming chamber 11. The feeder duct 28 may be equipped with means (not illustrated) for establishing whether a complete charge has been formed therein and operating the stuffer mechanism 29 in response thereto. Each action of the stuffer mechanism 29 introduces a "charge" or "flake" of crop material from the duct 28 into the chamber 11.

A plunger 13 reciprocates in a fore-and-aft direction within the bale-forming chamber 11. Biomass fed via the feeder duct 28 is thereby compacted, e.g. compressed or otherwise treated, so as to form bales in the above-described operation of the agricultural baler 10. Rectangular bales are formed. The formed bales 15, 16 may then be moved forward by the reciprocating motion of the plunger 13 to shift serially and incrementally along the bale-forming chamber 11 in a forward direction D towards a discharge outlet 14, wherefrom the bales may eventually be ejected. The baler 10 may furthermore comprise components such as a knotter mechanism for automatically tying the completed bales with e.g. twine or similar lineal object to make them self-supporting, for example for shipping and storage. Once tied, the bales are discharged from the discharge outlet 14 of the bale-forming chamber 11 onto a discharge in the form of a chute, generally designated 31, for gently lowering the bales near ground level.

In a first aspect, the present invention relates to an ejector system 1 for ejecting bales 15, 16 from a bale-forming chamber 11 of an agricultural baler 10. The ejector system 1 according to embodiments of the present invention may be used to provide alternative means to eject bales 15, 16 from the bale-forming chamber 11, e.g. to provide means for bale ejection independent from the reciprocating plunger 13. Such alternative means for bale ejection can prove useful for unloading remaining bales from the bale-forming chamber 11 when, for example, the baling process has terminated. Furthermore, the ejector system 1 may be operated in a full or in a partial ejection mode, e.g. allowing an operator to choose between unloading only the last bale 16 in the bale-forming chamber 11, i.e. the bale closest to the discharge outlet 14, or more bales 15, 16, for example the last bale 16 and the next-to-last bale 15 in the bale-forming chamber 11.

The ejector system 1 according to embodiments of the first aspect of the present invention comprises at least one shuttle assembly 2 comprising a plurality of protrusions 5, 6. The shuttle assembly 2 is selectively shiftable axially of the bale-forming chamber 11 generally toward and away from the discharge outlet 14 in repetitive ejecting strokes. The shuttle assembly 2 is thus adapted for reciprocating movement so as to allow propelling of at least two bales 15, 16 along the bale-forming chamber 11 in a forward direction D towards a discharge outlet 14 for ejection therefrom. The protrusions 5, 6 are arranged on the shuttle assembly 2 in an axially extending series. The ejector system 1 comprises a tilting means 3 for tilting the at least one shuttle assembly so as to retract a subset 6 of the plurality of protrusions from an extended position projecting into the bale-forming chamber 11 to a retracted position disposed outside the bale-forming chamber 11, e.g. to retract this subset 6 of the plurality of protrusions, such as the protrusions 6 which are most distal from the discharge outlet 14, in a direction away from the bale-forming chamber 11, so as to, during movement of the shuttle assembly 2 in a direction towards the discharge outlet 14, propel only the bale 16 present in the bale-forming chamber 11 closest to the discharge outlet 14.

The ejector system 1 according to embodiments of the present invention comprises at least one shuttle assembly 2, for example a shuttle assembly comprising a frame, e.g. a rigid frame such as a metal frame. Such a shuttle assembly 2 could for instance comprise bars and/or beams, e.g. interconnected at right angles, so as to form a frame with a flat, rectangular shape. This at least one shuttle assembly 2 according to embodiments of the invention may be adapted for mounting in a wall 12 of the bale-forming chamber 11, for example in the floor of the bale-forming chamber 11.

The at least one shuttle assembly 2 is adapted for reciprocating movement so as to allow propelling of at least two bales 15, 16 along the bale-forming chamber 11 in a forward direction D towards the discharge outlet 14 for ejection. For example, when the shuttle assembly 2 is mounted in a wall 12 of the bale-forming chamber 11, this shuttle assembly 2 may slide with respect to the wall 12, e.g. slide back and forth in a direction parallel to the forward direction D. This reciprocating movement may for example be driven hydraulically. This reciprocating movement may for example be driven by an actuator 4, and may be independent from the motion of the reciprocating plunger 13. Such actuator 4 may for example be an electric linear actuator, or a hydraulic cylinder, e.g. a double acting hydraulic cylinder controlled by a hydraulic circuit. The reciprocating movement of the at least one shuttle assembly 2 may be guided by a plurality of support elements 7, 8 for supporting the at least one shuttle assembly 2. Such support elements 7, 8 may for example comprise rollers, or any other type of suitable surface, like a transversal bar or a beam.

The at least one shuttle assembly 2 according to embodiments of the invention furthermore comprises a plurality of protrusions 5, 6, for example protrusions for engaging with and propelling the at least two bales 15, 16 in the bale-forming chamber 11 during movement of the shuttle assembly 2 in a direction towards the discharge outlet 14. According to embodiments of the invention, the plurality of protrusions 5,6 may furthermore be adapted for, during movement of the at least one shuttle assembly 2 in a direction away from the discharge outlet 14, moving past the at least two bales 15, 16 without shifting said at least two bales 15, 16 backward.

Figure 2:
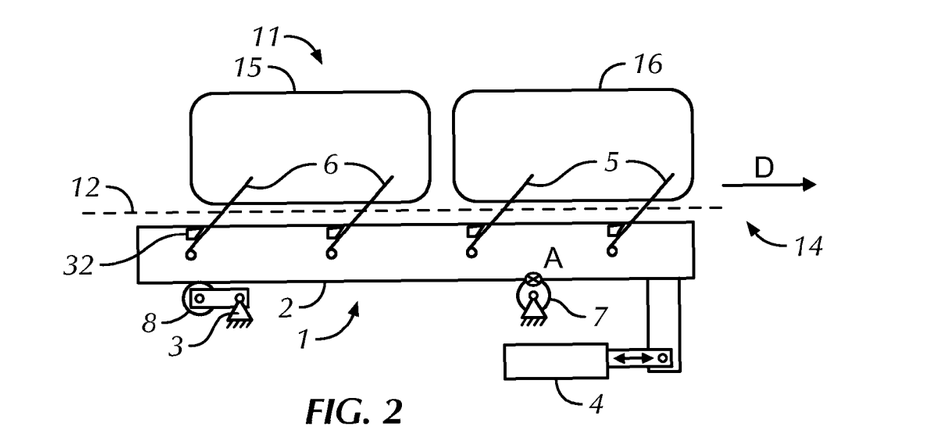
FIG. 2 shows a bale ejector system according to a first embodiment of the present invention in untilted position, ready for a full bale eject.
Figure 3:
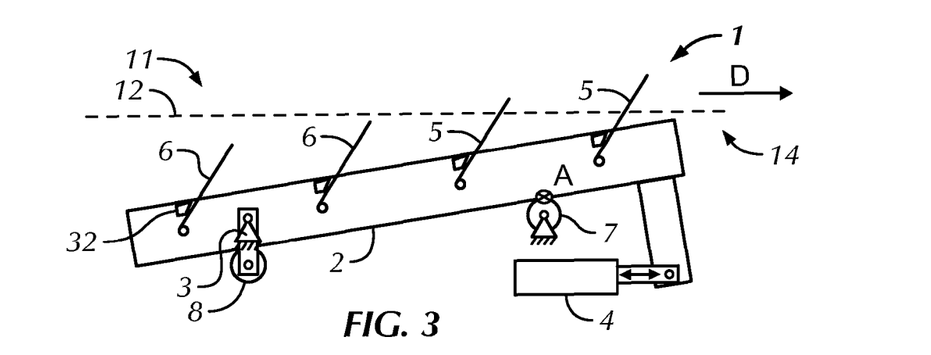
FIG. 3 shows a bale ejector system according to the first embodiment of the present invention in tilted position, ready for a partial bale eject.

For example, in embodiments of present invention, this plurality of protrusions 5, 6 may comprise dogs, which are pivotably mounted on the at least one shuttle assembly 2 to pivot into an extended gripping position during forward movements, i.e. in the direction D, of the shuttle assembly 2 to advance the bales 15, 16 towards the discharge outlet 14 and to retract during reverse movements, i.e. substantially opposite to the direction D, of the shuttle assembly 2 to slip relative to the bale. The arc of movement of each of such dogs may for example be limited by a stop 32 to limit the arc through which the dogs can pivot, e.g. to hold the dogs in the extended gripping position during forward movements. For example, an embodiment with such a plurality of protrusions 5, 6 comprising dogs and stops 32 is illustrated in FIG. 2 and FIG. 3. In such embodiment, an actuator 4 may drive the shuttle assembly 2 in the forward direction D, causing the dogs to pivot into a substantially upright position, e.g. an upright position, by pushing of the free ends of the dogs against the bales 15, 16, e.g. pivoting until blocked by stops 32. The dogs may then protrude into the bales 15, 16 in this position and pull the bales 15, 16 along towards the discharge outlet 14. When the actuator 4 completes a reciprocation cycle, driving the shuttle assembly 2 in a direction antiparallel to the forward direction D, the dogs pivot back to a more horizontal position, which allows slipping of the dogs underneath the bales 15, 16 without pulling the bales along.

The ejector system 1 furthermore comprises a tilting means 3 for tilting the at least one shuttle assembly 2 so as to retract a subset 6 of the plurality of protrusions from an extended position projecting into the bale-forming chamber 11 to a retracted position disposed outside the bale-forming chamber 11. Thus, during movement of the at least one shuttle assembly 2 in a direction towards the discharge outlet 14, only the bale 16 present in the bale-forming chamber 11 closest to the discharge outlet 14 is propelled. The tilting means 3 according to embodiments of the invention may furthermore be adapted for tilting the at least one shuttle assembly 2 around a tilt axis A substantially orthogonal to said forward direction D and substantially parallel to the wall 12 when the at least one shuttle assembly 2 is mounted therein.

This tilting means 3 may comprise, in particular embodiments of the invention, means for retracting a subset of the plurality of support elements 8 from an extended position projecting into the bale-forming chamber 11 to a retracted position disposed outside the bale-forming chamber 11 when tilting the shuttle assembly 2.

In a first exemplary embodiment of the present invention, as for example illustrated in FIG. 2 and FIG. 3, the shuttle assembly 2 is supported by support elements 7, 8, e.g. a plurality of rollers, rotatably mounted on axes. In the example illustrated, four support elements are provided, two at either side (left and right) of the bale-forming chamber 11, or, in other words, two support elements 8 at the front side and two support elements 7 at the back side of the bale-forming chamber 11. The tilting means 3 in this embodiment is adapted to allow adjustment in position of a subset of these support elements by an operator, the subset being for example both support elements at the front side and/or both support elements at the backside of the bale-forming chamber 11. In the example illustrated in FIG. 2 and FIG. 3, the subset of which the position is allowed to be adjusted is the subset of support elements 8 at the front side of the bale-forming chamber 11. In alternative embodiments (not illustrated in the drawings), all support elements 7, 8 may be allowed to be adjusted in position, so that e.g. in rest situation the shuttle assembly 2 is completely retracted below the level of the wall 12, e.g. floor, of the bale-forming chamber 11, having no parts sticking out into the bale-forming chamber 11. For a partial bale eject, only the support elements 7 at the back of the bale-forming chamber 11 may be adjusted in position, so as to raise that part of the shuttle assembly 2. For a full bale eject, both the support elements 7 at the back of the bale-forming chamber 11 and the support elements 8 at the front of the bale-forming chamber 11 may be adjusted in position, so as to raise the complete shuttle assembly 2.

The adjustment in position of the subset of support elements may for example be carried out by means of a manually operated lever mechanism or by means of an automated actuator (not shown).

In the embodiment illustrated in FIG. 2 and FIG. 3, when the tilting means 3 do not retract a subset of support elements from an extended position projecting into the bale-forming chamber 11 to a retracted position disposed outside the bale-forming chamber 11, the shuttle assembly 2 is in substantially horizontal position, e.g. horizontal position, and, when the shuttle assembly 2 is driven by means of an actuator 4, the protrusions 5, 6 may all engage with and propel bales 15, 16. This means that a full bale eject may be performed. When the tilting means 3 retract the subset of support elements 8 from an extended position projecting into the bale-forming chamber 11 to a retracted position disposed outside the bale-forming chamber 11, as illustrated in FIG. 3, the shuttle assembly 2 tilts around the tilt axis A. the actuator 4 may then drive the shuttle assembly 2 in a direction towards the discharge outlet 14, causing only the dogs 5 extending into the bale-forming chamber 11 to engage with the bale 16, thus pivoting into an upright position and moving only the last bale 16. More specifically, due to the tilting of the shuttle assembly 2, only the protrusions 5 stick out into the bale-forming chamber 11 and are able to contact and engage with a bale, e.g. the bale 16 positioned in the bale-forming chamber 11 closest to the discharge outlet 14. This way, a partial bale eject may be carried out.

Figure 4:
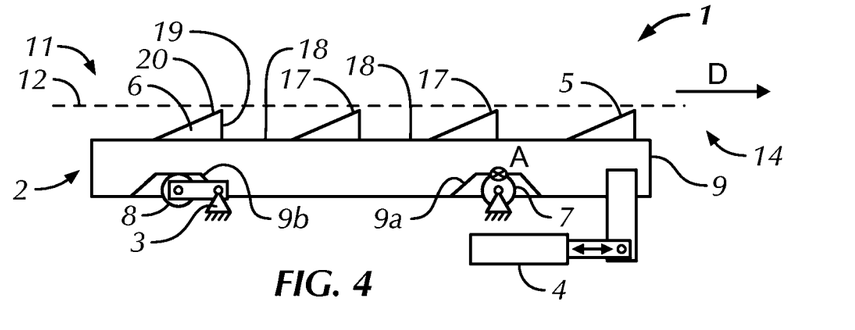
FIG. 4 shows a bale ejector system according to a second embodiment of the present invention in untilted rest position.
Figure 5:
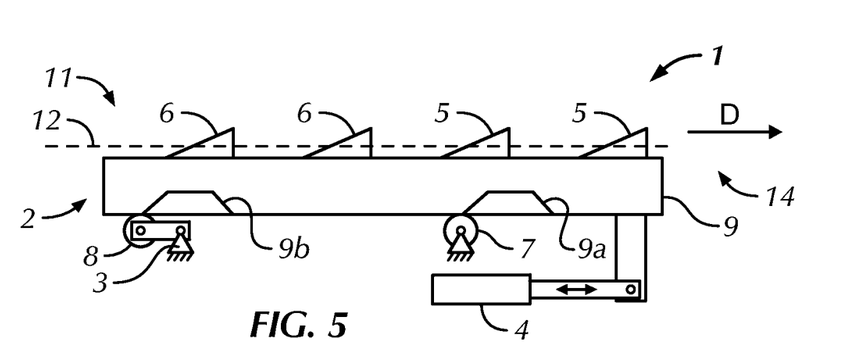
FIG. 5 shows a bale ejector system according to the second embodiment of the present invention in untilted position and driven forward, ready for a full bale eject.
Figure 6:
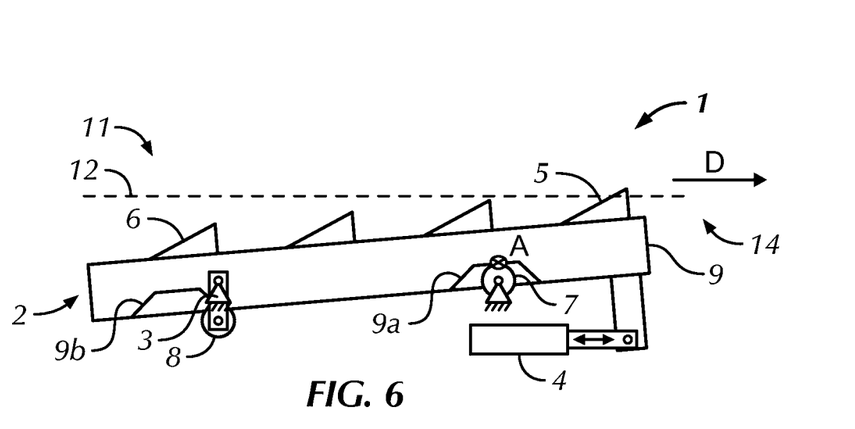
FIG. 6 shows a bale ejector system according to the second embodiment of the present invention in tilted position, ready for a partial bale eject.

In a second exemplary embodiment of the present invention, illustrated in FIG. 4 to FIG. 6, the at least one shuttle assembly 2 is supported by support elements 7, 8 as in the first embodiment. In this embodiment, however, the at least one shuttle assembly 2 comprises an indented profile 9 with at least one first indentation 9*a*, and at least one second indentation 9*b*.

This indented profile with indentations 9*a*, 9*b* may collaborate with the plurality of support elements 7, 8 which are adapted for supporting the at least one shuttle assembly 2 at the indented profile with indentations 9*a*, 9*b*. Thus, the indented profile 9 with indentations 9*a*, 9*b* may serve the purpose of shifting the at least one shuttle assembly 2 into or out of the bale-forming chamber 11 in response to the reciprocating movement applied by the actuator 4 onto the shuttle assembly 2. In other words, the indented profile 9 with indentations 9*a*, 9*b* may transform an oscillating movement along a line, for example such movement produced by an actuator 4, into a curved or piecewise linear trajectory. The indented profile 9 with indentations 9*a*, 9*b* may have any appropriate shape, insofar that during the reciprocating movement of the at least one shuttle assembly 2, at least one support element 7, 8 is guiding the shuttle assembly 2 in a tangential direction which is not constant during the complete reciprocating cycle. This profile 9 may for example comprise curved indented regions (not illustrated in the drawings), or piecewise linear indented regions 9*a*, 9*b*, e.g. polygonal excisions, e.g. tetragonal indents as illustrated in FIG. 4 to FIG. 9.

The plurality of support elements 7, 8 support and guide the at least one shuttle assembly 2 by moving over, e.g. by sliding or rolling over, the indentations 9*a*, 9*b* of this indented profile 9. In this second embodiment, the indented profile 9, by the movement of the indentations 9*a*, 9*b* over support elements 7, 8, is adapted for retracting the plurality of protrusions 5, 6 from an extended position projecting into the bale-forming chamber 11 to a retracted position disposed outside the bale-forming chamber 11 during movement of the shuttle assembly 2 in a direction away from the discharge outlet 14, while extending the plurality of protrusions 5, 6 in a direction towards the bale-forming chamber 11 during movement of the shuttle assembly 2 in a direction towards the discharge outlet 14. This shifting of the shuttle assembly 2 in a direction towards the bale-forming chamber may improve the engaging of bales 15,16 by the plurality of protrusions 5, 6 during forward strokes and the slipping without shifting these bales 15, 16 during reverse strokes, by limiting the interaction of the protrusions 5,6 with the bales 15, 16 during reverse strokes.

For example, the indented profile 9 may comprise indented regions 9*a*, 9*b* for receiving the support elements 7, 8, such that the reciprocating motion of the shuttle assembly 2 causes the support elements to slide into and out of the indented regions 9*a*, 9*b* of the indented profile 9.

This retracting of the protrusions 5, 6 from an extended position projecting into the bale-forming chamber 11 to a retracted position disposed outside the bale-forming chamber 11 allows a simplified design of the protrusions 5, 6, e.g. a design which avoids mechanical components such as pivotable dogs. The plurality of protrusions 5, 6 in this second embodiment may comprise a series of ridges 17 and furrows 18 separated by alternating steep 19 and shallow 20 edges, e.g. a series of corrugated teeth as illustrated in FIG. 4 to FIG. 6. This series extends along a direction substantially parallel to the forward direction D, such that the steep edges 19 are adapted for engaging and propelling the bales 15, 16 in the bale-forming chamber 11 during movement of the shuttle assembly 2 in a direction towards the discharge outlet 14, and the shallow edges 20 are adapted for slipping past the bales 15, 16 without shifting said bales during movement of the shuttle assembly 2 in a direction away from the discharge outlet 14. The indented profile 9 with indented regions 9*a*, 9*b* is adapted for retracting the protrusions 5,6 from an extended position projecting into the bale-forming chamber 11 to a retracted position disposed outside the bale-forming chamber 11, by lowering the shuttle assembly 2, when the shuttle assembly 2 moves in a direction away from the discharge outlet 14, to improve slipping of the shallow edges 20 past the bales 15,16, as illustrated in FIG. 4, and is adapted for inserting the protrusions 5,6 into the bale-forming chamber 11, by raising the shuttle assembly 2, when the shuttle assembly 2 moves towards the discharge outlet 14, as illustrated in FIG. 5.

In this second embodiment of the first aspect of the invention, the tilting means 3 is adapted to allow adjustment in position of a subset of these support elements 8, as in the first embodiment. When the tilting means 3 retract the subset of support elements 8 from an extended position projecting into the bale-forming chamber 11 to a retracted position disposed outside the bale-forming chamber 11, as illustrated in FIG. 6, the shuttle assembly 2 tilts around the tilt axis A, and thus retracts the subset of protrusions 6 from an extended position projecting into the bale-forming chamber 11 to a retracted position disposed outside the bale-forming chamber 11, in order to propel only the last bale 16 positioned in the bale-forming chamber 11 closest to the discharge outlet 14 during movement of the shuttle assembly 2 in a direction towards the discharge outlet 14.

The shuttle assembly 2 may furthermore comprise an actuator 4 for driving the reciprocating motion of the shuttle assembly 2. The actuator 4 may then drive the shuttle assembly 2 in a direction towards the discharge outlet 14, in such way that only the protrusions 5, a subset of the protrusions 5, 6, intrude into the bale-forming chamber, e.g. are elevated above the floor 12 of the bale-forming chamber 11.

In the embodiments illustrated in accordance with this second embodiment of the first aspect of the present invention, the indentations 9*a*, 9*b* in the indented profile 9 are symmetrical, e.g. identical in shape. If the indented profile 9 is in horizontal rest position, as illustrated in FIG. 4, the indentations 9*a*, 9*b* of the indented profile 9 are supported by the support elements 7, 8 and the protrusions 5, 6 are retracted from the bale-forming chamber.

When a full bale eject is desired, the indented profile 9 in horizontal position is driven by means of an actuator 4 in a direction towards the discharge outlet 14. The indented profile 9 moves over and supported by the support elements 7, 8.

The support elements 7, 8 are kept in fixed position and due to the shape of the indentations 9a, 9b, the indented profile 9 is pushed up, so that the protrusions 5, 6 project into the bale-forming chamber 11, where they engage with and propel the bales 15, 16 which are present there.

When a partial bale eject is desired, before actuating the shuttle assembly 2, a subset of the support elements may be changed in position, for example the support elements 8 at the front side of the bale-forming chamber 11 may be lowered, as illustrated in FIG. 6. When now actuating the shuttle assembly 2, the indented profile 9 will again move over and supported by the support elements 7, 8. Again, the support elements 7, 8 are kept in the now newly fixed position and due to the shape of the indentations, the indented profile 9 is pushed up. However, due to the changed position of the support elements 8 at the front side of the bale-forming chamber 11, only a subset of protrusions 5 will be pushed up enough to project into the bale-forming chamber 11, so that only these protrusions 5 engage with and propel the bale 16 on top thereof, thus providing only a partial bale eject.

In a third exemplary embodiment of the first aspect of the present invention, the plurality of protrusions 5, 6 comprises a series of corrugated teeth similar to the protrusions of the second embodiment. Also, in this third embodiment, the at least one shuttle assembly 2 comprises an indented profile 9 having indentations 9a, 9b. In this embodiment, however, the indentations 9a, 9b of the indented profile 9 are not identical in shape. The indentations are adapted such that, when the indented profile 9 moves over and supported by the support elements 7, 8, the support elements 8 at the front side of the bale-forming chamber 11 may still be in the corresponding indentation 9b of the indented profile 9, while the support elements 7 at the back side of the bale-forming chamber closer to the discharge outlet 14 have already left the corresponding indentation 9a of the indented profile 9. In the embodiment illustrated in FIG. 7 to FIG. 9, the indentation 9b at the front side of the bale-forming chamber 11 is wider than the indentation 9a closer to the discharge outlet 14. This, however, is not limiting the present invention. In alternative embodiments, for example, the indentations 9a, 9b could have identical shapes, but the support elements 7, 8 could be not symmetrically placed with regard to the corresponding indentations 9a, 9b.

Figure 7:
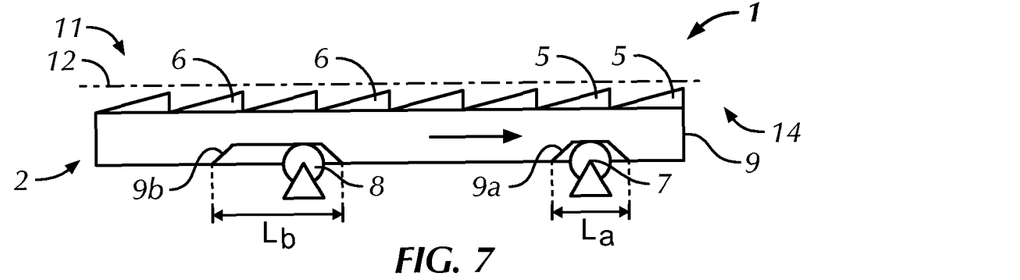
FIG. 7 shows a bale ejector system according to a third embodiment of the present invention in untilted rest position.
Figure 8:
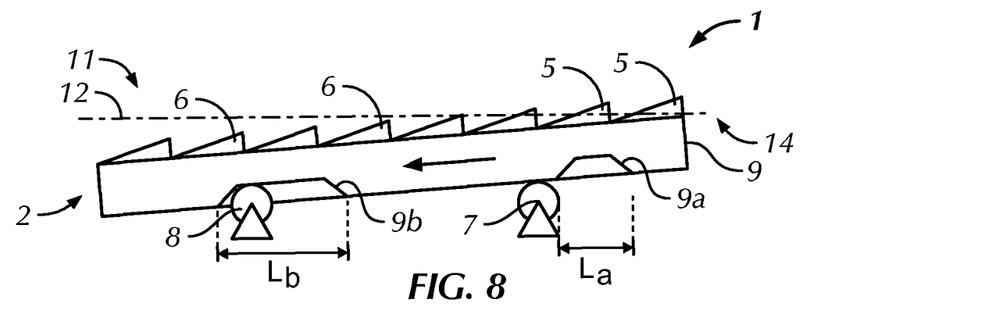
FIG. 8 shows a bale ejector system according to the third embodiment of the present invention in tilted position, ready for a partial bale eject.
Figure 9:
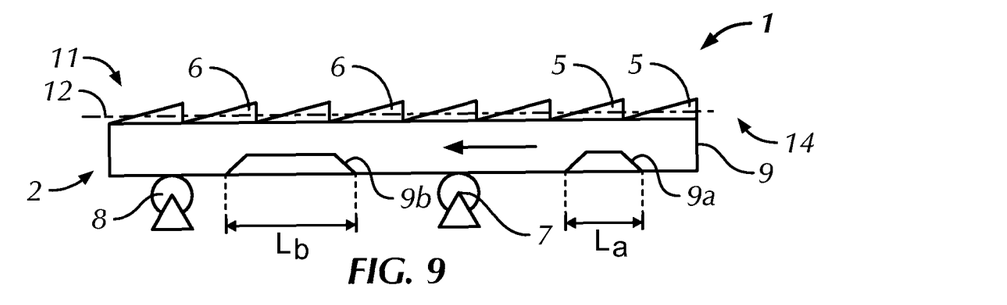
FIG. 9 shows a bale ejector system according to the third embodiment of the present invention in untilted position and driven forward, ready for a full bale eject.

As will be seen from FIG. 7 and FIG. 8, reciprocation of the at least one shuttle assembly 2 will result in a raising and lowering of the shuttle assembly 2, or at least the protrusions 5, 6 thereof, into and out of the bale-forming chamber 11, in a manner similar to the second embodiment, as illustrated in FIG. 4 and FIG. 5. However, in this third embodiment, the support elements 7, 8 are not raised and lowered to tilt the shuttle assembly 2. Instead, the tilting means 3 comprises different regions of the indented profile, for example at least a first indentation 9a having a first length $L_a$ and at least a second indentation 9b having a second length $L_b$ which is longer than the first length $L_a$, such that the shifting of the shuttle assembly 2, or at least the protrusions 5, 6 thereof, into and out of the bale-forming chamber 11 as result of the reciprocation of the shuttle assembly 2 may be executed at different timings and/or different slopes for these different indentations 9a, 9b. For example, for the ejector system 1, during a forward stroke, illustrated by the sequence in FIG. 7 to FIG. 9, the back support elements 7 will slide out of the rear indentation 9a of the indented profile before the front support elements 8 will slide out of the front indentation 9b. Hence, the back side of the indented profile 9 will be shifted upward, hence a subset of the protrusions 5 will be projected into the bale-forming chamber 11, before the front side of the indented profile 9 with protrusions 6 is shifted upward.

Therefore, retracting the subset 6 of the plurality of protrusions from the extended position projecting into the bale-forming chamber 11 to the retracted position disposed outside the bale-forming chamber 11, and thus, during movement of the shuttle assembly 2 in a direction towards the discharge outlet 14, propelling only the bale 16 present in the bale-forming chamber 11 closest to the discharge outlet 14, forms part of the reciprocation cycle of the at least one shuttle assembly 2, i.e. the initial part of the forward stroke. The complete forward stroke, e.g. having a stroke length of at least the second length $L_b$, of the reciprocating movement of the at least one shuttle assembly 2 still allows propelling of the at least two bales 15, 16 along the bale-forming chamber 11 towards the discharge outlet 14. Selection between a partial bale eject mode and a full bale eject mode is therefore possible by controlling the range of motion of an actuator 4 driving the at least one shuttle assembly 2, whereby a longer stroke, e.g. having a stroke length of at least the second length $L_b$, executes an incremental step of the full bale eject, i.e. the ejection of at least two bales 15,16, and a shorter stroke, e.g. having a stroke length shorter than the second length $L_b$, such as a stroke length in between the first length $L_a$ and the second length $L_b$, executes an incremental step of the partial bale eject, i.e. the ejection of only the bale 16 present in the bale-forming chamber 11 closest to the discharge outlet 14.

In a second aspect, the present invention relates to an agricultural baler 10 comprising an ejector system 1 according to embodiments of the first aspect of the present invention. Such a baler can basically be any square baler comprising features otherwise known in the art, for example a baler such as schematically illustrated in FIG. 1 and discussed earlier herein which is designed for, or retrofitted for, installation of the ejector system 1 in the bale-forming chamber 11.

In a third aspect, the present invention relates to a method 21 for ejecting a bale from a bale-forming chamber 11 of an agricultural baler 10. This method, for example the exemplary method 21 illustrated in FIG. 10, comprises driving 22 a reciprocating movement of at least one shuttle assembly 2. This shuttle assembly 2 comprises a plurality of protrusions 5, 6 so as to allow propelling of one or more bales along the bale-forming chamber 11 towards a discharge outlet 14 for ejection therefrom.

Figure 10:
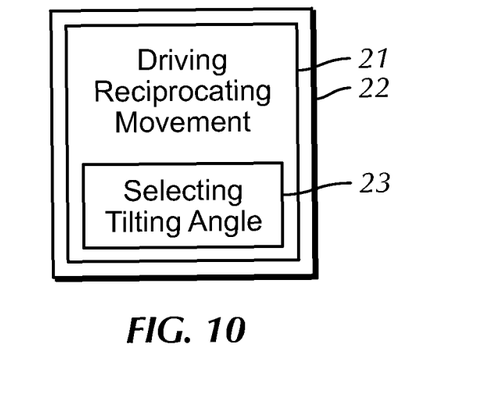
FIG. 10 shows an exemplary method according to a method aspect of the present invention.

This driving 22 of the reciprocating movement of the at least one shuttle assembly 2 includes selecting 23 a tilting angle of the at least one shuttle assembly 2 so as to, depending on the selected tilting angle, propel only one bale 16 or more than one bale 15, 16.

What is claimed is:

1. An ejector system for ejecting bales from a bale-forming chamber comprising:
    at least one shuttle assembly comprising a plurality of protrusions connected to at least one elongate frame member, the shuttle assembly adapted for reciprocating movement to propel at least two bales along the bale-forming chamber toward a discharge outlet for ejection therefrom, and
    a tilting device for tilting the at least one shuttle assembly including the at least one elongate frame member, wherein tilting the shuttle assembly retracts a subset of the plurality of protrusions from an extended position projecting into the bale-forming chamber to a retracted position disposed outside the bale-forming chamber such that during reciprocating movement of the shuttle assembly in a tilting position, only the bale present in the bale-forming chamber closest to the discharge outlet is propelled.

2. The ejector system according to claim 1, wherein said plurality of protrusions are adapted to move past the at least two bales without shifting said at least two bales during movement of the at least one shuttle assembly in a direction away from the discharge outlet.

3. The ejector system according to claim 1, wherein the at least one shuttle assembly is mounted in a wall of the bale-forming chamber.

4. The ejector system according to claim 1, wherein said tilting device is adapted for tilting the at least one shuttle assembly around a tilt axis substantially orthogonal to a forward direction and substantially parallel to the wall.

5. The ejector system according to claim 1, further comprising a plurality of supports for supporting the at least one shuttle assembly and guiding said reciprocating movement of the at least one shuttle assembly.

6. The ejector system of claim 5, wherein the tilting apparatus is configured for retracting a subset of the plurality of supports from an extended position projecting into the bale-forming chamber to a retracted position disposed outside the bale-forming chamber in order to tilt the shuttle assembly.

7. The ejector system according to claim 5, wherein the shuttle assembly comprises an indented profile and the plurality of supports are adapted for supporting the at least one shuttle assembly at the indented profile.

8. The ejector system of claim 7, wherein the indented profile is adapted for retracting the plurality of protrusions from the extended position to the retracted position during movement of the shuttle assembly in a direction away from the discharge outlet, while extending the plurality of protrusions in a direction towards the bale-forming chamber during movement of the shuttle assembly in a direction towards the discharge outlet.

9. The ejector system of claim 8, wherein the plurality of protrusions comprise a series of ridges and furrows separated by alternating steep and shallow edges, said series extending along a direction substantially parallel to the forward direction, such that the steep edges are adapted for engaging and propelling the bales in the bale-forming chamber during movement of the shuttle assembly in a direction towards the discharge outlet, and the shallow edges are adapted for slipping past said bales without shifting said bales during movement of the shuttle assembly in a direction away from the discharge outlet.

10. An ejector system for ejecting bales from a bale-forming chamber comprising:
at least one shuttle assembly comprising a plurality of protrusions, the shuttle assembly adapted for reciprocating movement to propel at least two bales along the bale-forming chamber toward a discharge outlet for election therefrom; and
a tilting device for tilting the at least one shuttle assembly, wherein tilting the shuttle assembly retracts a subset of the plurality of protrusions from an extended position projecting into the bale-forming chamber to a retracted position disposed outside the bale-forming chamber such that during movement of the shuttle only the bale present in the bale-forming chamber closest to the discharge outlet is propelled; and a plurality of supports for supporting the at least one shuttle assembly and guiding said reciprocating movement of the at least one shuttle assembly;
wherein the shuttle assembly comprises an indented profile and the plurality of supports are adapted for supporting the at least one shuttle assembly at the indented profile,
wherein the indented profile is adapted for retracting the plurality of protrusions from the extended position to the retracted position during movement of the shuttle assembly in a direction away from the discharge outlet, while extending the plurality of protrusions in a direction towards the bale-forming chamber during movement of the shuttle assembly in a direction towards the discharge outlet;
wherein the indented profile comprises at least one indentation having a first length and at least one indentation having a second length longer than the first length, and in which said indentations are adapted for tilting the shuttle assembly and retracting the subset of the plurality of protrusions from the extended position to the retracted position, in order to propel only the last bale positioned in the bale-forming chamber closest to the discharge outlet during movement of the shuttle assembly in a direction towards the discharge outlet.

11. The ejector system of claim 1, wherein the tilting device comprise an actuator adapted for driving the reciprocating motion of the shuttle assembly and adapted for tilting the shuttle assembly by shifting from a first range of reciprocating motion, having a stroke length shorter than the second length to a second range of reciprocating motion, having a stroke length of at least the second length.

12. The ejector system of claim 5, wherein the plurality of supports comprise a plurality of rollers.

13. The ejector system of claim 1, wherein the plurality of protrusions comprise dogs pivotably mounted on the shuttle assembly to pivot into an extended gripping position during forward movements of the shuttle to advance the bale towards the discharge outlet and to retract during reverse movements of the shuttle assembly to slip relative to the bale.

14. The ejector system of claim 1, in combination with an agricultural baler.

15. A method for ejecting a bale from a bale-forming chamber of a baler, comprising
driving of a reciprocating movement of at least one shuttle assembly comprising a plurality of protrusions connected to at least one elongate frame member so as to allow propelling of at least two bales along the bale-forming chamber towards a discharge outlet for ejection therefrom, and
tilting the at least one shuttle assembly including the at least one elongate frame member by a tilting device, wherein tilting the shuttle assembly retracts a subset of the plurality of protrusions from an extended position projecting into the bale-forming chamber to a retracted position disposed outside the bale-forming chamber such that during reciprocating movement of the shuttle assembly in a tilting position, only the bale present in the bale-forming chamber closest to the discharge outlet is propelled.

* * * * *